United States Patent Office 3,148,256
Patented Sept. 8, 1964

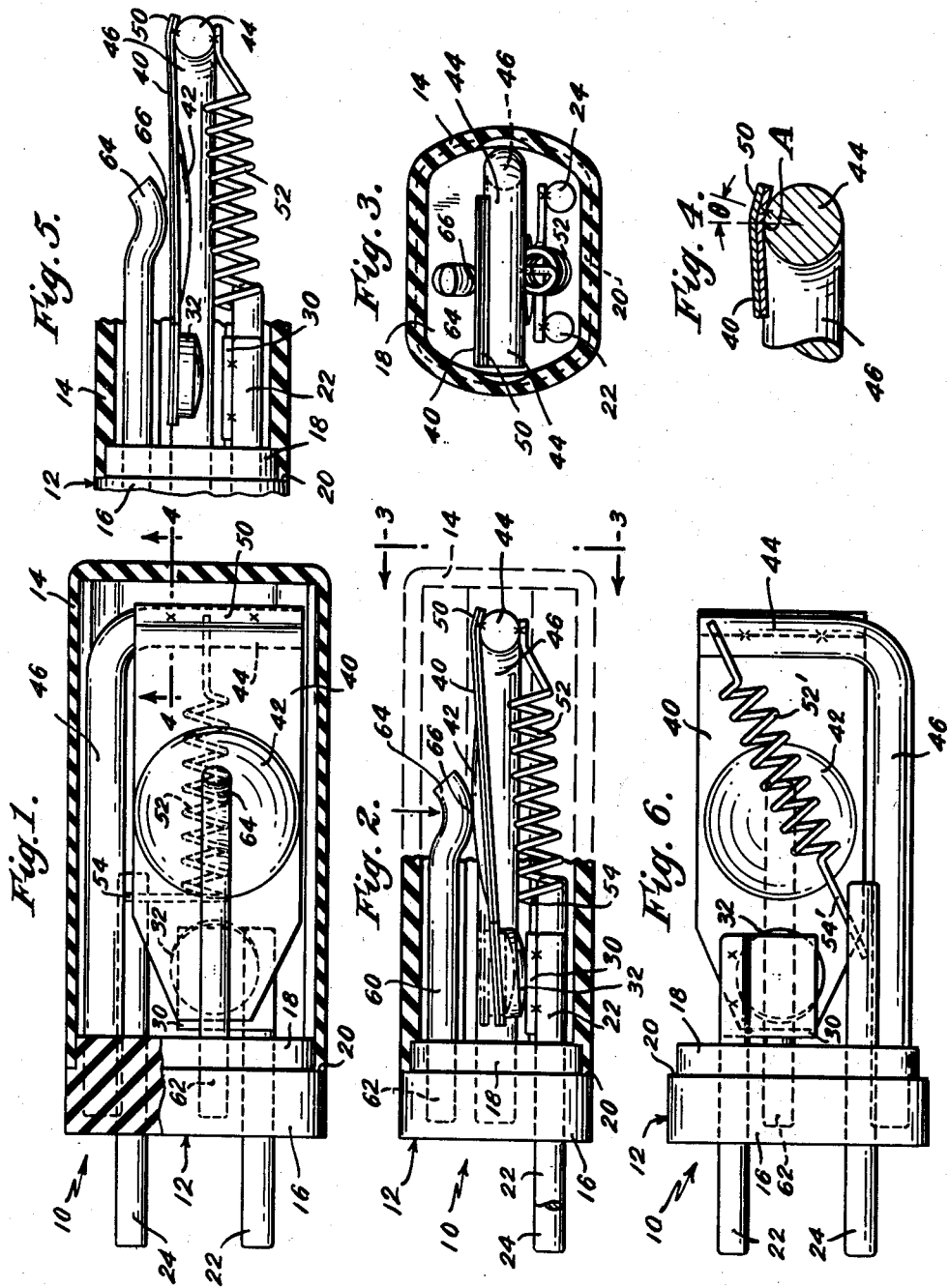

3,148,256
SNAP ACTION THERMOSTATIC SWITCHES
Frederick G. Perry, Barrington, R.I., assignor to Texas Instruments Incorporated, Dallas, Tex., a corporation of Delaware
Continuation of application Ser. No. 23,494, Apr. 20, 1960. This application Mar. 1, 1963, Ser. No. 262,820
14 Claims. (Cl. 200—122)

This invention relates to thermostatic switches, and in particular, to small thermostatic switches of the snap-acting type.

This application is a continuation of my co-pending United States Letters Patent application Serial No. 23,494, filed April 20, 1960, for Thermostatic Switches, now abandoned.

This invention lies in the field of miniaturized, simple and economically made thermostatic switches; and particularly thermostatic switches which are small enough to be inserted or embedded directly in the windings of small, fractional horsepower motors or into cavities of small motors and small transformers, the thermostatic switch serving to prevent such devices from overheating. It is to be understood, however, that the invention is not limited to such protective use mentioned above but may be used wherever found applicable.

It is one object of the instant invention to provide a thermostatic switch means which is simple in construction, adapted for miniaturization, inexpensive to manufacture, and reliable in operation.

It is another object of the instant invention to provide a thermostatic switch which is adapted for miniaturization so as to be conveniently insertable into the small spaces directly adjacent the heated parts of motors, transformers, fluorescent ballasts and the like, to which heating parts a temperature response is to be made by the switch.

It is yet another object of the instant invention to provide a thermostatic switch means which is safe and reliable in operation and is easily and simply calibrated.

Among the several further objects of the instant invention may be noted the provision of a thermostatic switch of such simplicity as to make it feasible for mass production; the provision of a switch of the class described which has a low heat mass and therefor has fast response; which may be easily calibrated; which is both heat and current sensitive, durable, accurate, compact, which is versatile and susceptible to varying electrical ratings, particularly low current ratings; which embodies a minimum number of parts; and which is simple and economical to manufacture.

Other objects will be in part apparent and in part pointed out hereinafter.

The invention accordingly comprises the elements and combinations of elements, features of construction and arrangements of parts which will be exemplified in the structures hereinafter described, and the scope of the application of which will be indicated in the following claims.

In the accompanying drawings, in which several of various possible embodiments of the invention are illustrated;

FIG. 1 is a top plan view, partly in section of one embodiment of the instant invention;

FIG. 2 is a front elevational view of the switch shown in FIG. 1, with parts of the cover broken away;

FIG. 3 is a view taken on line 3—3 of FIG. 2;

FIG. 4 is an enlarged detail sectional view taken on line 4—4 of FIG. 1;

FIG. 5 is a fragmentary front elevational view similar to FIG. 2 showing the snap-acting thermal element in a contacts-open position; and FIG. 6 is a bottom plan view of a switch similar to that shown in FIG. 2, but with a modified heater arrangement.

Similar reference characters indicate corresponding parts throughout the several views of the drawings.

Dimensions of certain of the parts as shown in the drawings have been modified for the purposes of clarity of illustration.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, and particularly to FIGS. 1–5, there is shown a thermostatic switch indicated generally by numeral 10, according to a first embodiment of the instant invention. Thermostatic switch 10 comprises a thermostatic subassembly indicated generally by numeral 12 and a tubular cover or container therefor indicated by numeral 14. Thermostatic subassembly 12 comprises a base plug 16. Base 16 includes a projecting hub 18 and a peripherally extending flange 20, each of which are adapted to mate with the open end portion of container or cover member 14, as best seen in FIGS. 1 and 2. Cover member 14 has an inside peripheral configuration at its open end so as to provide a snug fit over the hub 18 and flush engagement with base 16, as shown in FIGS. 1 and 2. Cover or container member 14 and base 16 are formed of an electrically insulating moldable resin such as the phenolic resins or other thermosetting types.

As will be clear from the following description, thermally responsive switch 10 is both heat and current sensitive and is adapted to prove so-called inherent overheat protection. Thermostatic switch 10 includes two electrically conducting terminals 22 and 24 extending through and projecting on opposite sides of base member 16. As best seen in FIGS. 1 and 2, terminal 22, at its inner end, mounts an electrically conducting stationary contact 30, which is adapted to mate with a movable contact 32 carried by a thermostatic snap-acting disc 40. Thermal element 40 is a snap-acting element and generally comprises a relatively thin, elongated thermostat metal strip having a dished area 42 which is responsible for its snap action, provided therein as shown. Such an element is shown and described in the John A. Spencer United States Patent 1,448,240 of March 13, 1923. Snap-acting element 40 may be formed of a conventional thermostatic material, such as for example, bimetal or trimetal. Contacts 30 and 32 may be formed of a conventional material such as silver or a silver alloy. Contact 32 may be secured to the free end of snap-acting thermal element 40 by riveting, welding or the like.

Thermostatic switch 10 includes an L-shaped mounting member having legs 44 and 46 substantially at right angles to each other. The free end of leg 46 is embedded in base member 16 and does not extend through to the opposite side, as best seen in FIGS. 1 and 6. Base member 16 cantilever mounts the L-shaped mounting means and maintains the same in electrically insulated relation to both terminals 22 and 24. Leg 44 is substantially parallel to base member 16 and serves to cantilever mount thermostatic snap-acting disc element 40, as best seen in FIGS. 1, 2 and 4. End 50 of thermostatic snap-acting element 40 is welded to leg 44 of the mounting means, as best shown in FIGS. 1 and 6. It has been found preferable to secure, end portion 50 of thermostatic snap-acting disc 40 (as by welding), to a portion of leg 44 at a point or points displaced from the vertical by angle $\theta$. Angle $\theta$ preferably ranges from 15° to 30°. The surface portion of leg 44 adjacent and intermediate the point or points of securement and the dimple portion 42 serves as a stop or an abutting portion which tends to prevent snap-acting disc 40 from creeping closed, prior to the occurrence of snap action. It should be understood that although mounting means 44 and 46 have been shown as cylindrical in shape, other cross-sectional configurations may also be employed. It is preferred, however, that such cross sectional configurations as are employed provide a surface portion which is adapted to engage the thermostatic disc so as to act as a limit stop and prevent the disc from creeping closed prior to snap action. It should also be understood that the end portion 50 of the disc may be preformed so as to be welded to leg 44 at other points displaced from the vertical (shown at point A in FIG. 4) (i.e., not within the preferred 15° to 30° range) so as to provide the desired limit stop surface portion. By "creep closed" is meant the closing of the contacts by slow motion of the thermostatic disc on the cooling cycle prior to the occurrence of snap action of dished shape portion 42. This arrangement advantageously removes the necessity for an additional stop means to prevent the disc from creeping closed and serves to minimize the thermal mass of the switch and thereby increases the rate of response of the switch. Thus it is seen that leg 44 serves the dual function of both cantilever mounting the thermostatic element 40 and also serves to prevent the element from creeping closed prior to the occurrence of snap action.

Electrically secured to the other side of leg 44, as by welding, is an electrical heater 52 which may take the form of conventional resistance heater wire or the like. Heater wire 52 may be provided with an electrically insulating coating. Although a round wire is illustrated as an example of a heating element, a planar heating element may also be used, and it is to be understood that this may be a strip, ribbon, or the like, arranged in a plane. The term "wire" is used herein as characterizing each of these heater parts. Heater 52 is electrically connected at its other free end to terminal 24. As best seen in FIG. 1, heater 52 is disposed below the snap-acting thermal element 40 and is in close thermal juxtaposition with the dished portion 42, responsible for the snap action of the element 40. Heater 52, in FIG. 1, is shown as extending across the dished portion in a direction substantially parallel to leg 46 of the mounting means. In the species of FIG. 6, heater 52', which corresponds to heater 52 shown in FIG. 1, extends diagonally across the dished or dimpled portion 42 of the snap-acting element 40. It should be understood that heater 52 may take various forms and be mounted in various ways between leg 44 and terminal 24 so as to be in close thermal juxtaposition to the dished portion of the snap-acting disc.

When contacts 30 and 32 are closed, as shown in FIG. 2, an electrically conductive path is established leading from terminal 22, to contact 30, contact 32, through thermally responsive snap-acting disc 40, to leg 44, serially through heater 52, to electrically conducting terminal 24.

Switch 10 further includes an elongated projecting element 60 which serves a dual function of providing a stop for dished portion 42 to bear against and snap from a contacts-closed position, as seen in full lines in FIG. 2, to a contacts-open position, as seen in the dashed lines in FIG. 2 and in full lines in FIG. 5, and also in providing a calibration means for the thermal element 40, as will be described in greater detail below. One end 62 of element 60 is cantilever mounted on and embedded in base 16, as best seen in FIG. 2. The other free end of element 60 includes a bent portion 64 which provides calibration arm 66 for dished portion 42 to bear against when in the contacts-closed position, as best seen in FIG. 2. Calibration arm 66, in bearing against the convex side of dished portion 42, when thermal element 40 is in a contacts-closed position, acts as a limit stop and co-operates to prevent the thermal element 40 from creeping to a contacts-open position prior to the occurrence of snap action. By anchoring the cantilever end 50 of the thermal element 40 in the manner described above, and by providing the calibration arm 66, creeping open is precluded and snap action is assured. Otherwise, in a condition of gradual temperature change, thermal element 40, as is characteristic of such dished snap-acting elements, might have a tendency to creep to open the contacts prior to its snap action in spite of the presence of the dimpled or dished portion 42.

Calibration arm 66, which is cantilever mounted by base 16 and is maintained in electrically insulated relation to terminals 22 and 24, provides a simple and efficient means for calibrating the disc 40. Temperature calibration is accomplished by bending calibration arm 66 and urging it against the dimpled or dished portion 42 of thermally responsive element 40 by urging (as seen in FIG. 2 and shown by the arrow). The mode of calibration afforded by calibration arm 66 advantageously permits quick and simple calibration and does not reduce the effective length of the elongated thermostatic element and permits maximum utilization of the internal resistance in the thermal element and also provides for maximum contact separation. It further permits maintaining the thermal mass at the dished portion to a minimum thereby affording faster response. Further, the fact that calibration arm 66 is cantilever mounted in phenolic base 16 and is maintained in electrically insulated relation with respect to the thermostatic element 40 and electrically conducting terminals 22 and 24 advantageously permits utilization of the full resistance of the thermostatic element 40 thereby providing a faster trip time for a given current for the switch. If the calibration arm were not so mounted, there is a possibility that portions of the disc current might be shunted and the utilization of the disc resistance might be minimized. The arrangement of the instant invention effectively advantageously precludes such undesirable effects.

Terminals 22 and 24, calibrating arm 66, and L-shaped mounting arm 46 may be cylindrical in form and may be formed of, for example, stainless steel. These elements may also be provided with knurled portions (not shown) for connection to base member 16. Thermostatic switch 10 may be quickly and easily assembled. After the thermostatic subassembly 12 is prepared and the disc 40 has been calibrated in the manner described above, the subassembly 12 is slidably inserted into cover member 14 and secured thereto, sealing the device.

The complete calibrated and sealed device, in applications as a motor protective device, may be inserted into a cavity in a small motor such as a miniature motor currently in use in military aircraft, or the device can be buried in the windings of a motor that it is to protect. In such a place, it is responsive immediately and faithfully to the actual temperature of the motor winding. The terminals 22 and 24 are, for example, connected in series with one lead to the motor winding. Thus, if the motor should approach a temperature which is deleterious to the winding insulation, or dangerous as a fire hazard, etc., thermostatic element 40 will snap upwardly (as shown in the dashed lines in FIG. 2 and in solid lines in FIG. 5) to separate movable contact 32 from stationary contact 30, thus interrupting the current to the motor. When the motor has cooled to a predetermined temperature which is a preselected amount below the "hot" snapping temperature, thermostatic element 40 will snap back to close the circuit of the motor for re-energization thereof. Heater 52, which is in electrical series connection with thermostatic disc 40, may be designed so as to pass normal load currents but with abnormal currents, will generate sufficient heat to quickly actuate the snap-acting disc 40 to snap to a contacts-open position and interrupt the circuit.

From the above, it can be seen that the instant invention provides a thermostatic switch which comprises a relatively small number of parts, which can be simply, quickly and inexpensively produced, and yet can be simply calibrated. The thermostatic switch comprises individual subassemblies which can be mass produced and quickly and inexpensively assembled into operative position. The thermostatic switch of the instant invention affords a miniaturized construction with a relatively small number of parts. Merely by way of illustration and not limitation, thermostatic switches according to the instant invention have been made in dimensions of approximately .575″ long by .200″ thick by .280″ wide. Further, thermostatic switch 10 is very versatile in use in a wide range of diverse applications and diverse current ratings. As an illustration of the relatively low operating currents afforded by the switches of the instant invention, thermostatic switches according to the instant invention have been made to operate on currents as low as 150 milli-amperes and which tripped in 15 seconds at a temperature of 25° C.

The unique construction of the thermostatic switch of the instant invention renders its operation substantially free from influence of vibration and renders the thermostatic switch particularly suited to applications where severe vibration is a factor.

The switch of the present invention has minimum heat mass and minimum size, leading to quick heat response. Such quick heat responses are very valuable and are critical in certain motor protection applications.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A thermostatic switch adapted for miniaturization comprising a base; first and second electrically conducting terminals mounted on said base; said first terminal providing a stationary contact; mounting means having at least two intersecting portions, one of said portions being secured to said base in electrically insulated relation to said first and second terminals; a snap-acting thermostatic member having a dished portion responsible for its snap action; said member being secured to and cantilever mounted on the other of said portions; said member supporting an electrical contact for movement into and out of engagement with said stationary contact; electrical heater means electrically connecting the other of said portions and said second terminal; and calibrating arm means having a portion thereof engageable with said dished portion of said thermostatic member; said portion of said calibrating arm means providing a surface for said dished portion to bear against and snap from a contacts-closed to a contacts-open position to inhibit said thermostatic member from creeping to a contacts-open position, prior to the occurrence of snap action.

2. A thermostatic switch adapted for miniaturization comprising a base; first and second electrically conducting terminals mounted on said base; said first terminal providing a stationary contact; mounting means having at least two intersecting portions, one of said portions being secured to said base in electrically insulated relation to said first and second terminals; a snap-acting thermostatic member having a dished portion responsible for its snap action; said member being secured to and cantilever mounted on the other of said portions; said other of said portions including stop means engageable with said thermostatic member to inhibit said member from creeping to a contacts-closed position prior to the occurrence of snap action; said member supporting an electrical contact for movement into and out of engagement with said stationary contact; electrical heater means electrically connecting the other of said portions and said second terminal; deformable calibrating arm means cantilever mounted on said base having a portion thereof engageable with said dished portion of said thermostatic member; said portion of said calibrating arm means also providing a surface for said dished portion to bear against and snap from a contacts-closed to a contacts-open position to inhibit said thermostatic member from creeping to a contacts-open position, prior to the occurrence of snap action.

3. The switch as set forth in claim 2 and wherein said calibrating arm means is secured to said base in electrically insulated relation to said first and second terminals.

4. A thermostatic switch comprising a base; first and second electrically conductive terminal members mounted in spaced electrically insulated relation on said base; said first terminal member providing a first electrical contact on one side of said base; mounting means cantilever mounted on said base in electrically insulated relation to said first and second terminal members, and having a first portion projecting from said one side of said base; said mounting means including a second portion extending at an angle from said first portion; an elongated snap-acting thermostatic member adjacent one end thereof being electrically connected to and cantilever mounted on said second portion; said member adjacent the other end thereof being electrically connected to and mounting an electrical contact for movement into and out of engagement wtih said first contact; said switch including deformable calibrating means mounted in electrically insulated relation to said first and second terminal members for calibrating said snap-acting strip; electrical heater means having substantial electrical resistance being electrically connected to said second portion and said second terminal; said heater means lying to one side of said member and in close thermal juxtaposition therewith.

5. A thermostatic switch adapted for miniaturization comprising a base having at least a portion thereof formed of electrically insulating material; first and second electrically conductive terminal members mounted in spaced electrically insulated relation on said base portion and each including end portions projecting from opposite sides of said base; said first terminal member providing a first electrical contact on one side of said base; mounting means cantilever mounted in said electrically insulating material on said base in electrically insulated relation to said first and second terminal members, and having a first portion projecting from said one side of said base; said mounting means including a second portion extending at an angle from said first portion; an elongated snap-acting thermostatic member having a deformed portion therein responsible for its snap action; said member adjacent one end thereof, being electrically connected to and cantilever mounted on said second portion as by welding; said member adjacent the other end thereof being electrically connected to and mounting an electrical contact for movement into and out of engagement with said first contact; said switch including deformable calibrating means mounted in electrically insulated relation to said first and second terminal members for calibrating said snap-acting member; and an electrical heater having substantial electrical resistance being electrically connected to said second portion and said second terminal; said heater lying to one side of said member and in close thermal juxtaposition therewith.

6. A thermostatic switch comprising a base formed of an electrically insulating material; first and second electrically conducting terminals mounted on said base and projecting externally thereof; said first terminal providing a stationary contact; a substantially L-shaped mounting member having one leg thereof cantilever mounted on said base in electrically insulated relation to said first and second terminals; a snap-acting thermostatic member having a dished portion responsible for its snap action; said member being welded to and cantilever mounted on the other leg of said L-shaped mounting member; said other leg providing a surface means engageable with said thermostatic member to prevent said member from creeping to a contacts-closing position prior to the occurrence of snap action; calibrating arm means mounted in said base in electrically insulated relation to said first and second terminals and said one leg; said calibrating arm means having a portion thereof engageable with said dished portion of said thermostatic member providing a surface for said dished portion to bear against and snap from a contacts-closed to a contacts-open position to prevent said member from creeping to a contacts-open position prior to the occurrence of snap action; and electrical heater means serially electrically connecting said other leg to said second terminal.

7. The thermostatic switch as set forth in claim 6 and wherein said other leg of said L-shaped mounting member has a substantially circular cross-sectional configuration and said thermostatic member is welded to a portion of the surface of said other leg, the tangent of which intersects the plane of said thermostatic member adjacent said dished portion.

8. The thermostatic switch as set forth in claim 6 and wherein said other leg of said L-shaped mounting member has a substantially circular cross-sectional configuration and said thermostatic member at its free end having a bent portion which is welded to said other leg.

9. A thermostatic switch adapted for miniaturization comprising a base; at least a portion of said base being formed of electrically insulating material; a first electrically conductive terminal means mounted in said electrically insulating material on said base and including end portions projecting from opposite sides of said base; said first terminal means providing a first contact on one side of said base; mounting means cantilever mounted in said electrically insulating material in electrically insulated relation to said first terminal means, and having a first portion projecting from said one side of said base; said mounting means including a second portion extending at an angle from the end of said first portion; said second portion being electrically conductive terminal means having a projecting portion extending from the other side of said base; a snap-acting thermostatic member having a dished portion therein responsible for its snap action; said member adjacent one end thereof being electrically connected to and cantilever mounted on said second portion as by welding; said second portion including stop means engageable with a portion of said thermostatic member adjacent said one end thereof to inhibit said member from creeping to a contacts-closed position prior to the occurrence of snap action; said member adjacent the other end thereof supporting an electrical contact for movement into and out of engagement with said first contact; a deformable calibrating arm cantilever mounted on said base in spaced electrically insulated relation to said first and second terminal means and having a portion thereof overlying and engageable with said dished portion of said thermostatic member; said portion of said calibrating arm providing a surface for said dished portion to bear against and snap from a contacts-closed to a contacts-open position to inhibit said thermostatic member from creeping to a contacts-open position, prior to the occurrence of snap-action; and said base being adapted to be received within a tubular housing on said one side thereof to entirely enclose said switch.

10. The thermostatic switch as set forth in claim 9 and wherein said mounting means is substantially L-shaped with said first portion comprising the long leg and said second portion comprising the short leg of said L-shape; said short leg having a substantially circular cross-sectional configuration and said thermostatic member being welded to a surface portion of said short leg, the tangent at said surface portion intersecting the plane of said thermostatic member adjacent said dished portion.

11. The switch as set forth in claim 10 and wherein the angle of intersection between said tangent and the plane of the thermostatic member ranges from 15° to 30°.

12. A thermostatic switch comprising a base; first and second electrically conductive terminal mounted on said base; said first terminal providing a first contact; substantially L-shaped mounting means having first and second intersecting leg portions, one of said leg portions being secured to said base in electrically insulated relation to said first and second terminals; a snap-acting thermostatic member having a dished portion responsible for its snap action; said member adjacent one end thereof being electrically connected to and cantilever mounted on the other of said leg portions; said member adjacent the other end thereof supporting an electrical contact for movement into and out of engagement with said first contact; said other of said leg portions being electrically connected to said second terminal; and a deformable calibrating arm cantilever mounted on said base in spaced electrically insulated relation to said first and second terminals; said arm having a portion thereof engageable with said dished portion of said thermostatic member, said portion of said calibrating arm means also providing a surface for said dished portion to bear against and snap in one direction to actuate said contacts to inhibit said thermostatic member from creeping in said one direction to actuate said contacts prior to the occurrence of snap action.

13. The thermostatic switch as set forth in claim 12 and wherein electrial heater means electrically connects said other of said leg portions with said second terminal.

14. A thermostatic switch adapted for miniaturization comprising a base formed of an electrically insulating material; first and second electrically conducting terminals mounted on said base and projecting externally thereof; said first terminal providing a stationary contact; a substantially L-shaped mounting member having one leg thereof cantilever mounted on said base in electrically insulated relation to said first and second terminals; a snap-acting thermostatic member having a dished portion responsible for its snap action; said member being welded to and cantilever mounted on the other leg of said L-shaped mounting member; said switch including adjustable calibrating means mounted in said base in electrically insulated relation to said first and second terminals for calibrating said thermostatic member; electrical heater means serially electrically connecting said other leg to said second terminal and said heater means being located to one side of and in intimate heat transfer relation to said snap-acting member, and a tubular housing surrounding said switch and connected with said base.

References Cited in the file of this patent

UNITED STATES PATENTS

| | | |
|---|---|---|
| 2,308,522 | Leuthold | Jan. 9, 1943 |
| 2,415,473 | Dougherty | Feb. 11, 1947 |
| 2,771,528 | Moran | Nov. 20, 1956 |
| 2,820,870 | Mokksu | Jan. 21, 1958 |